(12) United States Patent
Lu et al.

(10) Patent No.: US 8,742,030 B2
(45) Date of Patent: Jun. 3, 2014

(54) POLYAMINE POLYAMIDOAMINE EPIHALOOHYDRIN COMPOSITIONS AND PROCESSES FOR PREPARING AND USING THE SAME

(71) Applicant: Kemira Oyj, Helsinki (FI)

(72) Inventors: Chen Lu, Marietta, GA (US); Vladimir Grigoriev, Atlanta, GA (US); Danny Nguyen, Norcross, GA (US); Scott Rosencrance, Douglasville, GA (US)

(73) Assignee: Kemira Oyj (FI)

( * ) Notice: Subject to any disclaimer, the term of this patent is extended or adjusted under 35 U.S.C. 154(b) by 0 days.

(21) Appl. No.: 13/784,053

(22) Filed: Mar. 4, 2013

(65) Prior Publication Data

US 2013/0213593 A1    Aug. 22, 2013

Related U.S. Application Data

(62) Division of application No. 13/074,469, filed on Mar. 29, 2011.

(51) Int. Cl.
| | |
|---|---|
| *C08G 69/46* | (2006.01) |
| *C08G 69/28* | (2006.01) |
| *C09J 169/00* | (2006.01) |
| *B31F 1/12* | (2006.01) |

(52) U.S. Cl.
CPC .............. *C08G 69/46* (2013.01); *C08G 69/28* (2013.01)
USPC ........................... 525/430; 525/435; 528/340

(58) Field of Classification Search
CPC .............................. C08G 69/28; C08G 69/46
USPC ........................................ 525/430; 162/230
See application file for complete search history.

(56) References Cited

U.S. PATENT DOCUMENTS

| | | | | |
|---|---|---|---|---|
| 2,926,116 A * | 2/1960 | Keim | ......................... | 162/164.3 |
| 2,926,154 A | 2/1960 | Keim | | |
| 3,224,990 A | 12/1965 | Babcock | | |
| 3,556,932 A | 1/1971 | Coscia et al. | | |
| 3,556,933 A | 1/1971 | Williams et al. | | |
| 3,951,921 A * | 4/1976 | Espy et al. | ..................... | 525/430 |
| 4,129,722 A | 12/1978 | Iovine et al. | | |
| 4,250,299 A | 2/1981 | Lehmann et al. | | |
| 4,319,019 A | 3/1982 | Lehmann et al. | | |
| 4,605,702 A | 8/1986 | Guerro et al. | | |
| 4,847,315 A | 7/1989 | Hassler | | |
| 4,883,564 A * | 11/1989 | Chen et al. | ..................... | 162/112 |
| 5,019,606 A | 5/1991 | Marten et al. | | |
| 5,047,642 A | 9/1991 | Pleyber et al. | | |
| 5,085,736 A | 2/1992 | Bjorkquist | | |
| 5,171,795 A | 12/1992 | Miller et al. | | |
| 5,569,686 A * | 10/1996 | Makati et al. | ................. | 523/409 |
| 5,614,597 A | 3/1997 | Bower | | |
| 5,902,862 A | 5/1999 | Allen | | |
| 6,224,714 B1 | 5/2001 | Schroeder et al. | | |
| 6,274,662 B1 | 8/2001 | Lynch et al. | | |
| 6,277,242 B1 * | 8/2001 | Archer et al. | ................. | 162/111 |
| 6,908,983 B2 | 6/2005 | Maslanka | | |
| 7,081,912 B2 | 7/2006 | Seki et al. | | |
| 7,828,934 B2 | 11/2010 | Cyr et al. | | |
| 8,246,781 B2 * | 8/2012 | Ringold et al. | ............... | 162/111 |
| 2007/0208115 A1 | 9/2007 | Grigoriev et al. | | |
| 2008/0308242 A1 | 12/2008 | Lu et al. | | |
| 2009/0133896 A1 | 5/2009 | Kosaka et al. | | |
| 2010/0122785 A1 | 5/2010 | Grigoriev et al. | | |

FOREIGN PATENT DOCUMENTS

| | | | | |
|---|---|---|---|---|
| EP | 802215 A1 * | 10/1997 | ............. | C08G 73/02 |
| GB | 2141130 A | 12/1984 | | |
| WO | 0011046 A1 | 3/2000 | | |
| WO | 0043428 A1 | 7/2000 | | |
| WO | 00/50462 A1 | 8/2000 | | |
| WO | 0134903 A1 | 5/2001 | | |
| WO | 0183887 A1 | 8/2001 | | |

OTHER PUBLICATIONS

International Preliminary Report on Patentability dated Oct. 1, 2013.

\* cited by examiner

*Primary Examiner* — Mike M Dollinger
(74) *Attorney, Agent, or Firm* — Thomas Horstemeyer LLP

(57) ABSTRACT

Compositions of and processes for preparing a polyamine-polyamidoamine-epihalohydrin resin generally include reacting a first polyamine, a polyamidoamine, and an epihalohydrin to form the polyamine-polyamidoamine-epihalohydrin (PPAE) resin, wherein the polyamidoamine is prepared by reacting a polycarboxylic acid or a polycarboxylic acid derivative with a second polyamine to form the polyamidoamine, wherein a molar ratio of the polyamine to the polycarboxylic acid is 1.05 to 2.0. The PPAE resin can be used in an adhesive formulation for use in creping applications for forming paper products such as tissue products.

4 Claims, 1 Drawing Sheet

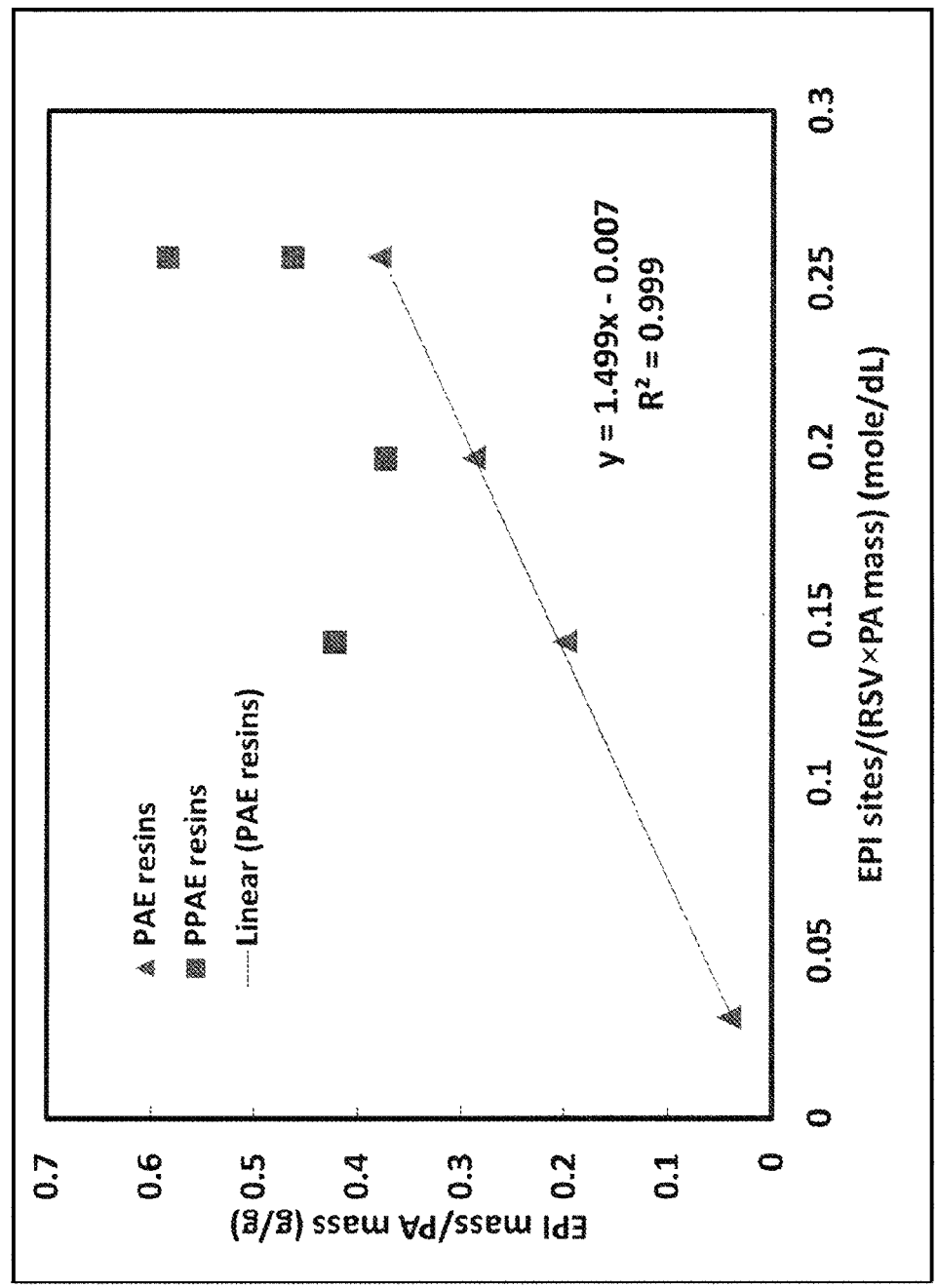

POLYAMINE POLYAMIDOAMINE EPIHALOOHYDRIN COMPOSITIONS AND PROCESSES FOR PREPARING AND USING THE SAME

CROSS-REFERENCE TO RELATED APPLICATION

This application is a divisional of co-pending U.S. Utility application Ser. No. 13/074,469 entitled "Polyamine Polyamidoamine Epihaloohydrin Compositions and Processes for Preparing and Using the Same" filed on Mar. 29, 2011, and which is entirely incorporated herein by reference.

BACKGROUND

The present disclosure generally relates to polymers that are useful in papermaking processes. More particularly, the present disclosure relates to polyamine-polyamidoamine-epihalohydrin compositions, methods of manufacture, and their use.

The creping application generally includes scraping a dried paper web from a drying cylinder (e.g., a Yankee dryer) by the use of a creping doctor blade. The creping action puts very small folds or accordions in the sheet to impart a fine, rippled texture to the sheet, which also increases the bulk, softness and absorbency of the sheet. Creping can occur when the sheet is almost completely dry, that is, 92 to 98% solids or when the sheet is wetter, around 70-85% solids. If the machine is designed to crepe at high dryness, it is referred to as a "dry crepe" machine. Dry creping has the greatest effect on sheet properties because the sheet is more firmly attached to the Yankee surface. If the machine is designed to crepe when the sheet is still somewhat wet, it is called a "wet crepe" machine.

Adhesion of the sheet to the drying cylinder is an important aspect of the creping process since it determines how the sheet crepes at the doctor blade. Sheet adhesion is generally controlled through application of an adhesive formulation onto the Yankee dryer surface. The creping process typically involves applying the creping adhesive, generally in the form of an aqueous solution or dispersion, to a drying surface for the web. Typically, this surface is the surface of a rotating heated creping cylinder, such as the Yankee dryer discussed above. The paper web is then adhered to the indicated surface and later dislodged from the surface with a creping device, e.g., using a doctor blade. The impact of the web against the creping device ruptures some of the fiber-to-fiber bonds within the web, causing the web to wrinkle or pucker. In this regard, fibrous webs, particularly paper webs, are conventionally subjected to the creping process in order to give them desirable textual characteristics, such as softness and bulk. It is well known that the use of adhesive formulations can provide improved product quality and better control of the papermaking process.

Drying cylinders such as the Yankee dryer are often operated under quite different temperature conditions, ranging from 90° C. to 130° C. Recent trends have the creping conditions moving towards high temperature and/or low sheet moisture. Under high temperature conditions, "rewettability" of the applied adhesive is critical to impart the adhesion of the sheet to the Yankee dryer. Rewettability refers to the ability of a dry adhesive film on the dryer to absorb water once in contact with the wet paper sheet. The adhesive is typically sprayed on the Yankee coating continuously. However, the majority of the adhesion occurs by means of the adhesive deposited in previous passes. If the adhesive absorbs greater amounts of water in contact with the sheet, the adhesive will be softer, resulting in a more intimate contact with the sheet and providing increased adhesion between the sheet and the dryer.

The solubility of the adhesive film in water is another essential property affecting adhesion. The wet sheet before the Yankee dryer typically contains 60% or more water. During the contact between the wet sheet and the Yankee dryer, water from the sheet may wash off a portion of the deposited adhesive coating, negatively impacting the efficiency of the creping process. In order to form a durable enough coating on the Yankee surface, relatively low water solubility (high insolubility) is often required for the adhesive film to withstand the wash-off at the point of contact with the wet sheet.

Polyamidoamine epichlorohydrin resins (PAE resins) have been applied in the manufacture of paper for a variety of applications. For example, PAE resins are widely used as strength additives to increase the paper wet strength. PAE resins are also the most common adhesives used in the creping process for producing tissue and towel products.

Conventional PAE resins are typically produced in a two step reaction. In the first step, a polyamidoamine is prepared by condensation of near equi-molar amounts of a polyamine and a polycarboxylic acid or polycarboxylic acid derivative. The polyamidoamine that is formed is then reacted with epichlorohydrin in an aqueous solution to produce the PAE resin. The detailed synthesis is well known and is documented in numerous patents, e.g., U.S. Pat. Nos., 2,926,116, and 7,175,740.

Much research has been carried out to develop modified PAE resins with improved performance for various applications. U.S. Pat. No. 3,951,921 describes a cationic water soluble resin consisting essentially of a PAE base resin having epoxide moieties and a nitrogen compound in an amount at least stoichiometrically equivalent to the epoxide moieties of the base resin. The nitrogen compounds are ammonia, ethyl amine, dimethyl amine and hydroxylamine U.S. Pat. No. 4,287,110 describes a PAE resin made form a polyamidoamine and an excess polyamine wherein the molar ratio of dicarboxylic acid to polyamine is 1:1 to 1:2. U.S. Pat. No. 5,338,807 is generally directed to a creping aid composition including a polyamide reaction product of an polyamide of a polycarbonxylic acid or of the ester of an aliphatic dicarboxylic acid and methyl bis(3-aminopropyl)amine with epichlorohydrin in a mole ratio of the polyamide to the epichlorohydrin between about 1:0.1 and about 1:0.33. U.S. Pat. No. 5,382,323 is generally directed to a creping aid of a polyamidoamine crosslinked with a multifunctional aldehyde. US Pat. Pub. No. 2008/0255320 is generally directed to a PAE resin made from a polyamidoamine with an excess polyamine, wherein the molar ratio of polyamine to polycarboxylic acid is in the range of 1.02:1 to 2:0.1.

While these PAE adhesive formulations are adequate for many creping applications, there is a continuing need for an adhesive with improved properties, including film rewettability, film insolubility, and adhesion.

BRIEF SUMMARY

Disclosed herein are compositions, methods of manufacture, processes of use. In one embodiment, the process for preparing the polyamine-polyamidoamine-epihalohydrin (PPAE) resin comprises reacting a polyamidoamine, a first polyamine, and an epihalohydrin to form the polyamine-polyamidoamine-epihalohydrin resin, wherein the polyamidoamine is prepared by a process comprising reacting a polycarboxylic acid and/or a polycarboxylic acid derivative with a second polyamine to form the polyamidoamine, wherein a molar ratio of the second polyamine to the polycarboxylic acid and/or polycarboxylic acid derivative is 1.05 to 2.0.

A process for forming a creped paper product comprising applying an adhesive formulation comprising a polyamine-polyamidoamine-epihalohydrin resin to a drying surface, wherein the polyamine-polyamidoamine-epihalohydrin resin has a rewettability ratio of 5 to 100, and an insolubility percentage of 5 to 100%, and wherein the polyamidoamine is prepared by a process comprising reacting a polycarboxylic acid and/or a polycarboxylic acid derivative with a second polyamine to form the polyamidoamine, wherein a molar ratio of the second polyamine to the polycarboxylic acid and/or polycarboxylic acid derivative is 1.05 to 2.0; pressing a paper web against the drying surface to effect adhesion of the paper web to the surface; and dislodging the paper web from the drying surface by contact with a doctor blade to form the creped paper product.

A composition comprises a polyamine-polyamidoamine-epihalohydrin resin, wherein the polyamidoamine is prepared by a process comprising reacting a polycarboxylic acid and/or a polycarboxylic acid derivative with a second polyamine to form the polyamidoamine, wherein a molar ratio of the second polyamine to the polycarboxylic acid and/or polycarboxylic acid derivative is 1.05 to 2.0.

The disclosure may be understood more readily by reference to the following detailed description of the various features of the disclosure and the examples included therein.

BRIEF DESCRIPTION OF THE DRAWINGS

The FIGURE graphically illustrates correlation between the molar quantity of epichlorohydrin-reactive sites on polyamidoamine and the molar quantity of charged epichlorohydrin.

DETAILED DESCRIPTION

Disclosed herein are polyamine-polyamidoamine-epichlorohydrin (PPAE) resins for use in adhesive compositions, methods of manufacture, and their use in creping applications.

The PPAE resins are generally the reaction product of three components: a polyamine, a polyamidoamine, and an epihalohydrin. In contrast, the prior art PAE resins are generally formed from the reaction product of two components: a polyamidoamine and a difunctional crosslinker such as epichlorohydrin. In the present invention, both the polyamidoamine and the polyamine can include primary and secondary amines that can react with epihalohydrin. Therefore, the epihalohydrin can cross-link the polyamidoamine and the polyamine during the reaction to form the PPAE resins, resulting in a branched polymeric structure. Applicants have discovered that the addition of the polyamine component during the reaction of the epihalohydrin and polyamidoamine components to form the PPAE resin provides the resulting PPAE reaction product with unexpectedly improved properties relative to the prior art PAE resins especially as it relates to adhesive performance, and as such, are suitable for use as creping adhesives in paper making process, among other uses.

The PPAE resins can generally be formed by reacting polyamine, polyamidoamine, and epihalohydrin in an aqueous medium. The weight ratios of polyamine to polyamidoamine can be from 1:100 to 100:1; in other embodiments from 1:50 to 50:1; and in still other embodiments from 1:20 to 20:1. The reaction temperature may be from 25 to 100° C.; in other embodiments from 40 to 90° C.; and in still other embodiments from 50 to 80° C. The total solids of the PPAE resins can be from 5 to 80%; in other embodiments from 10 to 50%; and in still other embodiments from 15 to 30%. The pH values of the PPAE resins can be from 2 to 10; in other embodiments from 3 to 9; and in still other embodiments from 3 to 8. The weight average molecular weight of the PPAE resins can be from 350 Daltons (Da) to 10 million Da; in other embodiments from 1000 Da to 5 million Da; and in still other embodiments from 5000 Da to 3 million Da.

The rewettability ratios of the PPAE resins can be from 5 to 100, more preferably from 7 to 50, and most preferably from 10 to 40. The insolubility percentages of the PPAE resins can be from 5 to 100%, more preferably from 10 to 85%, and most preferably from 15% to 70%. The rewettability ratio and the insolubility percentage are defined in the following sections.

The rewettability ratio and insolubility percentage are generally determined after immersion of the PPAE resin in water. The rewettability ratio is the weight ratio of a PPAE hydrogel formed after water immersion to the dry PPEA resin, wherein the hydrogel is the remaining PPAE resin plus any absorbed water after immersion. In the rewettability test, 4 g of adhesive product is added to a 200 mL beaker and dried at 90° C. for one hour and 110° C. for four hours to obtain the adhesive product in dry form. Afterwards, 50 g of water is added to the beaker. After 30 minutes of soaking at room temperature, excess water was removed from the beaker by decantation and the weight of the hydrogel was determined. The water used for rewetting was obtained by adding NaCl to de-ionized water to adjust the conductivity to 90 µs.

The insolubility percentage is calculated as the weight percentage of the remaining PPAE resin after water immersion and subsequent drying to the original adhesive dry solid content prior to water immersion. In the insolubility test, 4 g of adhesive product is added to a 200 mL beaker and dried at 90° C. for one hour and 110° C. for four hours to determine weight of the dry solid. Afterwards, 50 g of deionized or tap water is added to the beaker, which is then placed on an incubating shaker (e.g., Thermo Scientific MAXQ 4450) at 60° C. and 200 rpm. After 60 minutes of shaking, the adhesive suspension was poured onto a Nylon membrane with a pore size of 5 micron (e.g., OSMONICS, model number R50SP09025) and drained under vacuum. The remaining adhesive gel on the membrane was then dried in a convection oven and the weight of the remaining dried PPAE solid was determined. The insolubility percentage of the adhesive product was calculated as the weight percentage of the remaining dry solid content after immersion and drying over the original adhesive dry solid content.

The polyamines utilized to form the PPAE resin are not intended to be limited. Suitable polyamines generally include ammonium, aliphatic amines, aromatic amines, and any polyalkylenepolyamine, which includes polyethylene polyamines, polypropylene polyamines, polybutylene polyamines, polypentylene polyamines, polyhexylene polyamines, and mixtures thereof. Exemplary polyamines include, without limitation, ethylene diamine (EDA), diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethyl-piperazine (AEP), pentaetehylenehexamine (PEHA) and mixtures thereof.

Likewise, the polyamidoamines employed for forming the PPAE resins are not intended to be limited. Suitable polyamidoamines can generally be prepared by heating a polycarboxylic acid and/or a polycarboxylic acid derivative with one or more of the polyamines as noted above at a temperature of 125 to 200° C. for 1 to 10 hours while collecting the water of condensation produced in the reaction at atmospheric pressure. The reaction is usually allowed to proceed until the theoretical amount of water distillate is collected from the reaction. Where a reduced pressure is employed, lower temperatures such as 75° C. to 180° C. may be utilized. At the end of this reaction, the resulting product is dissolved in water at a concentration of about 20 to 90% by weight total polymer solids, more typically at a concentration of about 30 to 80%, and most typically at a concentration of about 40 to 70%.

In the preparation of the polyamidoamines, the molar ratio of the polyamine to the polycarboxylic acid and/or polycarboxylic acid derivative is at about from 1.05 to 2.0.

The polycarboxylic acid and/or polycarboxylic acid derivatives thereof that may be used to prepare the polyamidoamines are not intended to be limited. Suitable polycarboxylic acids and/or derivatives thereof include but are not limited to malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phthalic acid, isophthalic acid, terephthalic acid, 1,2,4-benzenetricarboxylic acid (trimellitic acid), 1,2,4,5-benzenetetracarboxylic acid (pyromellitic acid), carboxylate esters, acid halides, acid anhydrides, and mixtures thereof.

Exemplary esters of polycarboxylic acids include, but are not limited to, dimethyl adipate, dimethyl malonate, diethyl malonate, dimethyl succinate, dimethyl glutarate and diethyl glutarate. Exemplary acid anhydrides include, but are not limited to, succinic anhydride, maleic anhydride, N,N,N',N'-ethylenediaminetetraacetate dianhydride, phthalic anhydride, mellitic anhydride, pyromellitic anhydride, and mixtures thereof. Exemplary acid halides include, but are not limited to, adipoyl chloride, glutaryl chloride, sebacoyl chloride, and mixtures thereof.

The epihalohydrin is a difunctional crosslinker that is used to prepare the PPAE resins. Exemplary epihalohydrins include epichlorohydrin, epifluorohydrin, epibromohydrin, and epiiodohydrin as well as alkyl-substituted epihalohydrins. In one embodiment, the difunctional crosslinker for preparing the PPAE resins is epichlorohydrin.

The PPAE resins can be used in creping adhesive formulations for use in the creping process, which is commonly practiced in the manufacture of tissue and towel grades of paper. The paper web used in these applications can be comprised of various types of natural and recycled fibers including wood pulps of chemical and mechanical types. The fibers can comprise hardwood, softwood and cotton fibers. The tissue web can also contain particulate fillers, fines, ash, organic contaminates such as the cellophane from envelope windows, adhesives such as PVA-styrene-butadiene and inks as well as process chemicals used in the paper-making process such as strength additives, softeners, surfactants and organic polymers.

The PPAE creping adhesive formulation generally includes at least the PPAE resin, which may be in the form of an aqueous solution or a dispersion of about 20 to 95% water and 80 to 5% PPAE. The formulation may further include one or more additional components such as water-soluble polymers for use as co-adhesives, such as additional polyamine epichlorohydrin resins, polyacrylamide, poly(vinyl alcohol), polyvinylamine, polyethyleneimine, polymethacrylamide, poly(acrylic acid), poly(methacrylic acid), poly(hydroxyethyl acrylate), poly(hydroxyethyl methacrylate), poly(n-vinyl pyrrolidinone), poly(ethylene oxide), hydroxyethyl cellulose, hydroxypropyl cellulose, guar gum, starch, agar, chitosan, alginic acid, carboxymethyl cellulose, highly branched polyamidoamines, silylated polyamidoamines, mixtures thereof, and the like. When combined with other water-soluble polymers in the formulation, the weight ratio of PPAE resins prepared according to the processes of the present invention to the other water soluble polymers can be in the range of from 0.01 to 0.99 up to from 0.99 to 0.01.

Creping adhesive formulations comprising the PPAE resin may also comprise one or more release aids, as well as other additives that may affect the creping process. This is known as the creping adhesive package. Suitable creping release agents are, for example, disclosed in U.S. Pat. Nos. 5,660,687; and 5,833,806, the disclosures of which are incorporated herein by reference in their entireties. Exemplary release aids include, without limitation, mineral oil, vegetable oil, polyethylene glycol monoester, polyethylene glycol diester, ethoxylated polyethylene glycol, fatty acid imidazolinium surfactant, ethylene glycol, propylene glycol, diethylene glycol, glycerol, sorbitol, dipropylene glycol, pyrrolidone, aromatic sulfonamides, triethanolamine, diethanolamine, and mixtures thereof. In addition to adhesive components and release agent additives, creping adhesive formulations can further comprise surfactants, dispersants, salts to adjust the water hardness, acids or bases to adjust the pH of the creping adhesive composition, modifiers, or other useful additives. Suitable modifiers include, but are not limited to, the tackifier resins of U.S. Pat. No. 6,133,405, or the stabilizers of U.S. Pat. No. 6,280,571, the disclosures of which are incorporated herein by reference in their entireties. By way of example, the creping adhesive formulation may include phosphate such as monoammonium phosphate and diammonium phosphate as well as plasticizers such as glycerol, and polyethylene glycol.

The PPAE resins can be applied either by themselves or in combination with other components in the creping adhesive package as a means for creping a fibrous web, and employing this means to crepe the web. Further in this regard, the creping process of the invention can include the steps of applying the PPAE resin either by itself or in combination with the creping adhesive package to a drying surface for the fibrous web, providing a fibrous web, pressing the fibrous web against the drying surface to adhere this web to the surface, and dislodging the fibrous web from the drying surface with a creping device to crepe the fibrous web.

Application of the creping adhesives can be done in any manner known in the art and in forms comprising aqueous, solid, dispersion, or aerosol. One preferred mode of application is via a spray boom directed at the surface of the drying surface prior to transfer of the paper web. The creping adhesives can also be added at the wet end of the paper machine or can be applied to the wet web prior to its contact with the surface. Spray application of the creping adhesive can be done according to any of the conventional methods known in the art or any desired combination of application procedures.

An exemplary process includes applying an adhesive formulation comprising a polyamine-polyamidoamine-epihalohydrin resin to a drying cylinder; pressing a paper web against the drying cylinder to effect adhesion of the paper web to a surface of the drying cylinder to effect adhesion of the paper web to the drying cylinder; and dislodging the paper web from the drying cylinder by contact with a doctor blade to form the creped paper.

The total amount of the PPAE resin that is applied from about 0.01 g/kg to 5 g/kg (0.02 lb/ton to 10 lb/ton) based on the dry weight of the creping adhesive and dry weight of the paper web. The unit lb/ton, as used herein, refers to the dry amount of the creping adhesive measured in lbs/ton relative to the dry amount of paper measured in tons.

The following examples fall within the scope of, and serve to exemplify, the more generally described methods set forth above. The examples are presented for illustrative purposes only, and are not intended to limit the scope of the disclosure.

EXAMPLES 1-3

Preparation of Polyamidoamines

Polyamidoamine was first prepared by a condensation reaction of an excess amount of diethylenetriamine with adipic acid. In particular, diethylenetriamine was added to a three neck flask. Adipic acid was then slowly added to the flask and the reaction mixture heated to 165-170° C. and maintained for a period of 5 hours. At the end of the reaction, the product was diluted with water to adjust the concentration to 60% and the temperature was lowered to room temperature. Table 1 shows the charge ratios of diethylenetriamine and adipic acid.

TABLE 1

Charge ratios of polyamidoamine

| Example | Diethylenetriamine/adipic acid molar ratio |
|---|---|
| 1 | 1.4 |
| 2 | 1.6 |
| 3 | 1.8 |
| 4 | 1.0 |

EXAMPLES 4-16

Preparation of PPAE Resins

Polyamidoamine, polyamine, and water were first added to a one liter reactor with reflux. The reactor was heated to 70° C. and maintained at this temperature throughout the reaction. Epichlorohydrin was then added to the reactor slowly to increase product viscosity. Water was added stepwise during the reaction to reduce viscosity buildup rate to avoid product gelation. Once the product reached the desired viscosity range, final charge of water was added to the reactor and pH was adjusted to around 5.0 using concentrated sulfuric acid (95%). The total solids of the products were around 15%. Table 2 shows the charge ratios and properties of the PPAE products.

TABLE 2

Charge ratios and properties of PPAE resins

| Ex. No. | Polyamidoamine | Polyamine | Polyamine/ polyamidoamine weight ratio | pH | Brookfield viscosity at 23° C. (cP) |
|---|---|---|---|---|---|
| 4 | Example 1 | TETA | 0.22 | 5.0 | 24 |
| 5 | Example 1 | TETA | 0.22 | 5.0 | 55 |
| 6 | Example 1 | TETA | 0.22 | 5.0 | 95 |
| 7 | Example 2 | DETA | 0.07 | 4.9 | 24 |
| 8 | Example 2 | DETA | 0.07 | 4.9 | 52 |
| 9 | Example 2 | DETA | 0.07 | 4.9 | 69 |
| 10 | Example 2 | DETA | 0.07 | 5.0 | 96 |
| 11 | Example 3 | DETA | 0.07 | 5.0 | 26 |
| 12 | Example 3 | DETA | 0.07 | 5.0 | 82 |
| 13 | Example 3 | DETA | 0.07 | 5.0 | 96 |

TABLE 2-continued

Charge ratios and properties of PPAE resins

| Ex. No. | Polyamidoamine | Polyamine | Polyamine/ polyamidoamine weight ratio | pH | Brookfield viscosity at 23° C. (cP) |
|---|---|---|---|---|---|
| 14 | Example 3 | TETA | 0.24 | 5.0 | 5 |
| 15 | Example 3 | TETA | 0.24 | 5.0 | 26 |
| 16 | Example 3 | TETA | 0.24 | 5.0 | 92 |

COMPARATIVE EXAMPLES 1-5

Polyamidoamine and water were added to a one liter reactor with reflux. The reactor was heated to 70° C. and maintained at this temperature throughout the reaction. Epichlorohydrin was then added to the reactor slowly to increase product viscosity. Water was added stepwise during the reaction to reduce viscosity buildup rate to avoid product gelation. Once the product reached the desired viscosity range, final charge of water was added to the reactor and pH was adjusted to around 5.0 using concentrated sulfuric acid (95%). The total solids of the products were around 15%. Table 3 shows the charge ratios and properties of the Comparative Examples. The Omnicrepe 681 AX adhesive referenced in Table 3 below was a commercial creping adhesive product available from Kemira Chemicals.

TABLE 3

Charge ratios and properties of comparative examples

| Comparative Examples | Polyamidoamine | Polyamine/ polyamidoamine weight ratio | pH | Brookfield viscosity at 23° C. (cP) |
|---|---|---|---|---|
| 1 | Example 1 | 1.4 | 5.0 | 23 |
| 2 | Example 1 | 1.4 | 5.0 | 64 |
| 3 | Example 3 | 1.8 | 5.0 | 7 |
| 4 | Example 3 | 1.8 | 5.0 | 40 |
| 5 | Example 3 | 1.8 | 5.0 | 93 |
| 6 | Example 2 | 1.6 | 5.0 | 37 |
| 7 | Example 2 | 1.6 | 5.0 | 97 |
| 8 | Example 2 | 1.6 | 5.0 | 140 |
| 9 | Example 4 | 1.0 | 4.0 | 90 |
| Omnicrepe 681 AX | | ~1.0 | 4.0 | |

Epichlorohydrin-Reactive Sites on Polyamidoamine

The polyamidoamine samples contain both primary amine groups and secondary amine groups. It is commonly accepted that each secondary amine group reacts with one epichlorohydrin molecule, whereas each primary amine group reacts with two epichlorohydrin molecules. Therefore, the total number of epichlorohydrin-reactive sites in a polyamidoamine sample is defined as $$N = a1 + Z \times a2 \quad (1)$$

N is the molar quantity of epichlorohydrin-reactive sites, a1 is the molar quantity of secondary amine groups, and a2 is the molar quantity of primary amine groups. a1 and a2 are defined as $$a1 = n \frac{m1}{MW2} \quad (2)$$

-continued $$a2 = \left(\frac{m1}{MW1} - \frac{m2}{MW2}\right) \times 2 \quad (3)$$

where m1 is the mass of polyamine used to prepare the polyamidoamine sample, m2 is the mass of dicarboxylic acid and/or its derivative used to prepare the polyamidoamine sample, MW1 is the formula weight of polyamine, MW2 is the formula weight of dicarboxylic acid or its derivative and n is the number of secondary amines in the polyamine Reduced specific viscosity (RSV) was measured using a glass capillary viscometer at 30° C. The efflux time of each sample was determined three times and the average efflux time was calculated. The RSV was calculated as following $$RSV = (t-t_0)/(t_0 c) \quad (4),$$

wherein t is the average efflux time of the polyamidoamine sample diluted with 1 M NaCl solution, $t_0$ is the average efflux time of 1 M NaCl solution, c is the concentration of the diluted polyamidoamine sample which was 5 wt %.

Table 4 lists the active polyamidoamine mass (PA mass), the calculated molar quantities of epichlorohydrin-reactive sites on polyamidoamine (EPI sites), the RSVs of the polyamidoamine samples (RSV), and also the mass quantities of charged epichlorohydrin to increase sample final viscosity above 50 cps at 23° C. (EPI mass). As shown in FIG. 1, the x-axis is the ratio of EPI sites over the product of RSV and PA mass, the y-axis is the ratio of EPI mass over PA mass. For four PAE resins, the correlation between x-axis and y-axis is linear with a $R^2$ of 0.999. In contrast, the data points for the PPAE resins show a complex non-linear correlation and do not fit the PAE linear correlation. Furthermore, the data points of the PPAE resins are all above the fitted line for the PAE resins, suggesting that a greater amount of epichlorohydrin is required to achieve the desired viscosity range compared to the PAE resins. Theoretically, the ratio of EPI mass over PA mass (y-axis) of the PPAE resins will become infinitely large when the ratio of PA mass over extra polyamine mass becomes infinitely small. Overall, these differences demonstrate that the molecular structure of the PPAE resins is fundamentally different from that of the PAE resins.

TABLE 4

Polyamidoamine mass (PA mass), epichlorohydrin-reactive sites on polyamidoamine (EPI sites), reduced specific viscosity (RSV), and the mass quantities of charged epichlorohydrin to increase sample final viscosity above 50 cps at 23° C. (EPI mass)

| Name | Chemistry | Backbone DETA/Adipic acid molar ratio | PA mass (g) | EPI sites (mole) | RSV (dL/g) | EPI mass (g) |
|---|---|---|---|---|---|---|
| Comparative Example 2 | PAE | 1.4 | 107.7 | 1.27 | 0.083 | 21.5 |
| Comparative Example 5 | PAE | 1.8 | 77.0 | 1.30 | 0.066 | 29.3 |
| Comparative Example 7 | PAE | 1.6 | 53.6 | 0.781 | 0.074 | 15.4 |
| Comparative Example 9 | PAE | 1.0 | 129.6 | 0.608 | 0.156 | 5.3 |
| Example 6 | PPAE | 1.4 | 58.2 | 0.690 | 0.083 | 24.5 |
| Example 10 | PPAE | 1.6 | 68.7 | 1.00 | 0.074 | 25.6 |
| Example 13 | PPAE | 1.8 | 87.2 | 1.48 | 0.066 | 40.4 |
| Example 16 | PPAE | 1.8 | 82.6 | 1.40 | 0.066 | 48.2 |

Adhesive Performance Tests

In this invention, a rewettability test and an insolubility test were carried out to study adhesive properties. The rewettability test provides the insight about adhesive re-activation when in contact with the wet paper sheet. A more rewettable adhesive deposit will become softer in contact with the wet sheet since water plasticizes the adhesive deposit. Consequently, the Yankee dryer and the sheet form a more intimate contact, resulting in a higher adhesion. The insolubility test was employed to determine the percentage of the adhesive remaining un-dissolved in the presence of water. Therefore, the insolubility is closely related to the "durability" of the adhesive on the Yankee.

In the rewettability test, 4 g of adhesive product was added to a 200 mL beaker and dried at 90° C. for one hour and 110° C. for four hours to obtain the adhesive product in dry form. Afterwards, 50 g of water was added to the beaker. After 30 minutes of soaking at room temperature, excess water was removed from the beaker by decantation and the weight of adhesive hydrogel was determined. The water used for rewetting was obtained by adding NaCl to de-ionized water to adjust the conductivity to 90 µs. The rewettability ratio was calculated as the weight ratio of the adhesive hydrogel to the dry adhesive. Table 5 shows the rewettability result. When comparing the PPAE samples and the PAE samples prepared using the same polyamidoamine, the PPAE samples provided higher rewettability ratios than the PAE samples.

TABLE 5

Rewettability results

| Example | Chemistry | Backbone DETA/Adipic acid molar ratio | Rewettability ratio |
|---|---|---|---|
| Comparative Example 2 | PAE | 1.4 | 7.4 |
| Comparative Example 4 | PAE | 1.8 | 13.8 |
| Comparative Example 7 | PAE | 1.6 | 18.0 |
| Omnicrepe 681 AX | PAE | ~1.0 | 9.2 |
| Example 5 | PPAE | 1.4 | 20.0 |
| Example 10 | PPAE | 1.6 | 21.1 |
| Example 13 | PPAE | 1.8 | 17.0 |

In the insolubility test, 4 g of adhesive product was added to a 200 mL beaker and dried at 90° C. for one hour and 110° C. for four hours to determine the dry solid content. Afterwards, 50 g of water was added to the beaker which was then placed on an incubating shaker (Thermo Scientific MAXQ 4450) at 60° C. and 200 rpm. After 60 minutes of shaking, the adhesive suspension was poured on a Nylon membrane with a pore size of 5 micron (OSMONICS, model number R50SP09025) and drained under vacuum. The remaining adhesive gel on the membrane was then dried in a convection oven and the weight of the dry solid was determined. The insolubility percentage of the adhesive product was calculated as the weight percentage of the remaining dry solid content over the original adhesive dry solid content. The results are shown in Table 6.

Adhesive rewettability and insolubility are often inversely related to each other. For example, increasing adhesive hydrophobicity can increase adhesive insolubility but decrease adhesive rewettability. In contrast, decreasing adhesive cross-linking degree can increase adhesive rewettability but decrease adhesive insolubility. However, the introduction of polyamine in the polyamidoamine epichlorohydrin resin structure can increase both properties at the same time relative to PAE. As shown in Table 6, both Comparative Example 4 (PAE) and Example 15 (PPAE) were prepared using the same polyamidoamine with a DETA/AA ratio of 1.8. Relative to the PAE resin, the incorporation of extra TETA in Example 15 not only increased the rewettability ratio from 13.8 to 15.4 but also resulted in an increase in the insolubility percentage from 46% to 58%.

TABLE 6

Rewettability and insolubility results

| Example | Chemistry | Backbone DETA/Adipic acid molar ratio | Rewettability ratio | Insolubility (%) |
|---|---|---|---|---|
| Comparative Example 4 | PAE | 1.8 | 13.8 | 46 |
| Example 15 | PPAE | 1.8 | 15.4 | 58 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for forming a creped paper product comprising:
applying an adhesive formulation comprising a polyamine-polyamidoamine-epihalohydrin (PPAE) resin to a drying surface, wherein the PPAE resin is a reaction product of three components: a first polyamine, a polyamidoamine, and an epihalohydrin, and wherein the polyamidoamine is prepared by a process comprising reacting a polycarboxylic acid and/or a polycarboxylic acid derivative with a second polyamine to form the polyamidoamine, wherein a molar ratio of the second polyamine to the polycarboxylic acid and/or polycarboxylic acid derivative is 1.05 to 2.0, wherein the first polyamine is selected from the group consisting of: aliphatic amines, aromatic amines, polyalkylenepolyamines, and a mixture thereof;
pressing a paper web against the drying surface to effect adhesion of the paper web to the surface; and
dislodging the paper web from the drying surface by contact with a doctor blade to form the creped paper product.

2. The process of claim 1, wherein the creped paper product is an article selected from the group consisting of facial tissue, bath tissue, wipes, paper, towels, paper napkins, filter papers, and coffee filters.

3. The process of claim 1, wherein the epihalohydrin is epichlorohydrin.

4. The process of claim 1, wherein the first polyamine is selected from the group consisting of: ethylene diamine (EDA), diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethyl-piperazine (AEP), pentaethylenehexamine (PEHA), and a mixture thereof.

* * * * *